(12) United States Patent
Lee et al.

(10) Patent No.: US 8,848,810 B2
(45) Date of Patent: Sep. 30, 2014

(54) MULTIPLE TRANSMITTER SYSTEM AND METHOD

(75) Inventors: Chulkyul Lee, San Diego, CA (US); Anosh Davierwalla, San Diego, CA (US); George Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1316 days.

(21) Appl. No.: 12/042,362

(22) Filed: Mar. 5, 2008

(65) Prior Publication Data

US 2009/0225873 A1    Sep. 10, 2009

(51) Int. Cl.
*H04K 1/10* (2006.01)
*H04B 14/04* (2006.01)
*H04L 12/28* (2006.01)
*H04L 25/02* (2006.01)
*H04L 25/49* (2006.01)

(52) U.S. Cl.
CPC ............ *H04L 25/0272* (2013.01); *H04L 25/49* (2013.01)
USPC ............................. 375/260; 375/242; 370/258

(58) Field of Classification Search
CPC .............. H04L 25/0272; H04L 25/028; H04L 25/0292; H04L 25/0298; H04L 1/0041; H04L 25/40; G06F 13/4291; G06F 3/1236; G06F 17/5063
USPC .................................. 375/260, 242; 370/258
See application file for complete search history.

(56) References Cited

U.S. PATENT DOCUMENTS

| | | | |
|---|---|---|---|
| 4,201,958 A | 5/1980 | Ahamed | |
| 4,980,898 A * | 12/1990 | Silvian | 375/295 |
| 5,259,002 A | 11/1993 | Carlstedt | |
| 5,359,595 A | 10/1994 | Weddle et al. | |
| 5,381,414 A | 1/1995 | Gibson | |
| 5,664,948 A | 9/1997 | Dimitriadis et al. | |
| 5,682,157 A * | 10/1997 | Asmussen et al. | 341/68 |
| 5,733,131 A | 3/1998 | Park | |
| 5,809,519 A | 9/1998 | Lee | |
| 5,852,630 A | 12/1998 | Langberg et al. | |
| 5,939,939 A * | 8/1999 | Gaynor et al. | 330/124 R |
| 6,081,513 A | 6/2000 | Roy | |
| 6,091,709 A | 7/2000 | Harrison et al. | |
| 6,243,761 B1 | 6/2001 | Mogul et al. | |

(Continued)

FOREIGN PATENT DOCUMENTS

| | | |
|---|---|---|
| CN | 1871635 A | 11/2006 |
| DE | CN1871635 * | 11/2006 |

(Continued)

OTHER PUBLICATIONS

International Search Report-PCT/US2009/034943, International Search Authority-European Patent Office Jun. 24, 2009.

(Continued)

*Primary Examiner* — Leon-Viet Nguyen
*Assistant Examiner* — Sarah Hassan
(74) *Attorney, Agent, or Firm* — Nicholas J. Pauley; Raphael Freiwirth

(57) ABSTRACT

Systems and methods of data transmission are disclosed. In an embodiment, at least two transmitters are selectively activated and at least one transmitter is deactivated at a serial interface to transmit data via at least two distinct lines.

30 Claims, 7 Drawing Sheets

(56) References Cited

U.S. PATENT DOCUMENTS

| | | |
|---|---|---|
| 6,256,509 B1 | 7/2001 | Tanaka et al. |
| 6,288,739 B1 | 9/2001 | Hales et al. |
| 6,346,832 B1 | 2/2002 | Young |
| 6,359,931 B1 | 3/2002 | Perino et al. |
| 6,430,196 B1 | 8/2002 | Baroudi |
| 6,452,420 B1 | 9/2002 | Wong |
| 6,556,628 B1 | 4/2003 | Poulton et al. |
| 6,587,037 B1 | 7/2003 | Besser et al. |
| 6,611,503 B1 | 8/2003 | Fitzgerald et al. |
| 6,649,377 B1 | 11/2003 | Allard et al. |
| 6,654,565 B2 * | 11/2003 | Kenny .......... 398/182 |
| 6,694,377 B1 | 2/2004 | Beyer |
| 6,703,868 B2 * | 3/2004 | Savaria et al. ........ 326/101 |
| 6,778,493 B1 | 8/2004 | Ishii |
| 6,797,891 B1 | 9/2004 | Blair et al. |
| 6,813,638 B1 | 11/2004 | Sevanto et al. |
| 6,865,610 B2 | 3/2005 | Bolosky et al. |
| 6,867,668 B1 | 3/2005 | Dagostino et al. |
| 6,914,637 B1 * | 7/2005 | Wolf et al. ............ 348/473 |
| 7,113,550 B2 * | 9/2006 | Stonecypher et al. ........ 375/288 |
| 7,143,177 B1 | 11/2006 | Johnson et al. |
| 7,145,411 B1 | 12/2006 | Blair et al. |
| 7,233,773 B2 | 6/2007 | Hansen et al. |
| 7,263,133 B1 | 8/2007 | Miao |
| 7,269,430 B2 | 9/2007 | Moorti et al. |
| 7,336,139 B2 | 2/2008 | Blair et al. |
| 7,529,957 B2 | 5/2009 | Krantz et al. |
| 7,688,929 B2 | 3/2010 | Co |
| 7,826,551 B2 | 11/2010 | Lee et al. |
| 7,859,356 B2 | 12/2010 | Pandey |
| 8,024,477 B2 | 9/2011 | Rothman et al. |
| 8,064,535 B2 | 11/2011 | Wiley |
| 2002/0061072 A1 | 5/2002 | Pickering et al. |
| 2002/0064247 A1 * | 5/2002 | Ahn et al. ............ 375/354 |
| 2002/0112070 A1 * | 8/2002 | Ellerbrock et al. ........... 709/238 |
| 2002/0181618 A1 * | 12/2002 | Muranaka .................. 375/316 |
| 2003/0117184 A1 * | 6/2003 | Fecteau et al. .................. 327/94 |
| 2004/0039504 A1 * | 2/2004 | Coffee et al. .................. 701/35 |
| 2005/0144225 A1 | 6/2005 | Anderson et al. |
| 2005/0151868 A1 | 7/2005 | Fraenkel et al. |
| 2005/0156755 A1 * | 7/2005 | Miller .................. 340/854.6 |
| 2005/0204057 A1 | 9/2005 | Anderson et al. |
| 2006/0034326 A1 | 2/2006 | Anderson et al. |
| 2006/0192697 A1 * | 8/2006 | Quick et al. .................. 341/60 |
| 2006/0271678 A1 | 11/2006 | Jessup et al. |
| 2007/0009018 A1 | 1/2007 | Wang |
| 2007/0160155 A1 | 7/2007 | Choi |
| 2007/0164883 A1 | 7/2007 | Furtner |
| 2007/0164884 A1 | 7/2007 | Ihs |
| 2010/0215118 A1 | 8/2010 | Ware et al. |
| 2010/0235673 A1 | 9/2010 | Abbasfar |
| 2011/0138210 A1 | 6/2011 | Belali et al. |
| 2011/0268225 A1 | 11/2011 | Cronie et al. |
| 2011/0294359 A1 | 12/2011 | Cho et al. |
| 2011/0299555 A1 | 12/2011 | Cronie et al. |
| 2011/0302478 A1 | 12/2011 | Cronie et al. |
| 2012/0051241 A1 | 3/2012 | Mori et al. |
| 2012/0155565 A1 | 6/2012 | Wiley |
| 2012/0230626 A1 | 9/2012 | Metz et al. |
| 2013/0051162 A1 | 2/2013 | Amirkhany et al. |
| 2013/0215991 A1 | 8/2013 | Wiley |
| 2013/0241759 A1 | 9/2013 | Wiley et al. |
| 2013/0339507 A1 | 12/2013 | Wiley |
| 2014/0003543 A1 | 1/2014 | Wiley |
| 2014/0006649 A1 | 1/2014 | Wiley et al. |
| 2014/0112401 A1 | 4/2014 | Wiley et al. |
| 2014/0153665 A1 | 6/2014 | Wiley et al. |

FOREIGN PATENT DOCUMENTS

| | | | |
|---|---|---|---|
| EP | 1207649 | * | 5/2002 |
| GB | EP1207649 | * | 5/2002 |
| JP | 2002199032 A | | 7/2002 |
| WO | 9202988 A1 | | 2/1992 |
| WO | 2005041164 | | 5/2005 |
| WO | 2011134678 A1 | | 11/2011 |
| WO | 2011151469 A1 | | 12/2011 |
| WO | 2012089803 A2 | | 7/2012 |

OTHER PUBLICATIONS

Written Opinion-PCT/US2009/034943, International Search Authority-European Patent Office Jun. 24, 2009.

Hsueh, "Crosstalk Suppression Technique for Multi-Wire High-Speed I/O Links," ProQuest Dissertations and Theses; 2010; UCLA, 189 pages.

Sevanto, J., "Multimedia messaging service for GPRS and UMTS", IEEE on WCNC, Sep. 1999, pp. 1422-1426, vol. 3.

Taiwan Search Report—TW098107168—TIPO—May 10, 2012.

Zheng, "Skew compensation techniques for multi-gigabit wire-line data communications," Dissertation, The University of Texas at Dallas, 2010, 126 pages.

Zogopoulos, "A Low-Power High-Speed Single-Ended Parallel Link Using Three-Level Differential Encoding," USC, Dissertation, May 2007, 92 pages.

International Search Report—PCT/US2009/034943, International Search Authority—European Patent Office Jun. 24, 2009.

Written Opinion—PCT/US2009/034943, International Search Authority—European Patent Office Jun. 24, 2009.

John Poulton, Stephen Tell, and Robert Palmer, "Multiwire Differential Signaling," UNC-CH Departmetn of Computer Science, Version 1.1—Aug. 6, 2003.

* cited by examiner

MULTIPLE TRANSMITTER SYSTEM AND METHOD

I. FIELD

The present disclosure is generally related to a system and method of data transmission using multiple transmitters.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Large amounts of data may be transferred within such portable devices. For example, multimedia data may be retrieved from a memory within the device, processed by a digital processor, and provided to a display. Data transfer may be performed by a serialize/deserialize ("SerDes") unit with a transmission stage that receives data via parallel inputs and transmits the data serially via one or more lines, such as by differential signaling. A receiving stage may receive and convert the serial data to parallel data.

III. SUMMARY

In a particular embodiment, a system is disclosed that includes a first transmitter coupled to a first transmission line, a second transmitter coupled to a second transmission line, and a third transmitter coupled to a third transmission line. During operation, two of the three transmitters are conductive and at least one of the three transmitters is not conductive. The non-conductive transmitter may be in a high-impedance state.

In another particular embodiment, an electronic device is disclosed that includes an image sensing device and a data processing circuit. The electronic device also includes a serial interface coupled to the processing circuit and to the image sensing device. The serial interface includes at least three transmitters.

In another particular embodiment, the electronic device includes a display and a processing circuit. The electronic device further includes means for serial transmission coupled to the processing circuit and to the display. The means for serial transmission includes at least three receivers configured to receive a signal via three wires from three transmitters.

In another particular embodiment, a method is disclosed that includes selectively activating at least two transmitters and deactivating at least one transmitter at a serial interface to transmit data via at least two distinct lines.

In another particular embodiment, a method is disclosed that includes receiving a data signal from a set of transmitters including a first transmitter driving a first line, a second transmitter driving a second line, and a third transmitter driving a third line. The data signal includes a first signal from the first transmitter and a second signal from the second transmitter. The third transmitter is inactive.

A particular advantage provided by disclosed embodiments is that data may be transmitted using three or more lines with a reduced power consumption due to at least one transmitter being inactive. Power consumption is also reduced due to lower parasitic capacitance. Another particular advantage is reduced signal noise resulting from common mode termination of multiple transmission lines.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
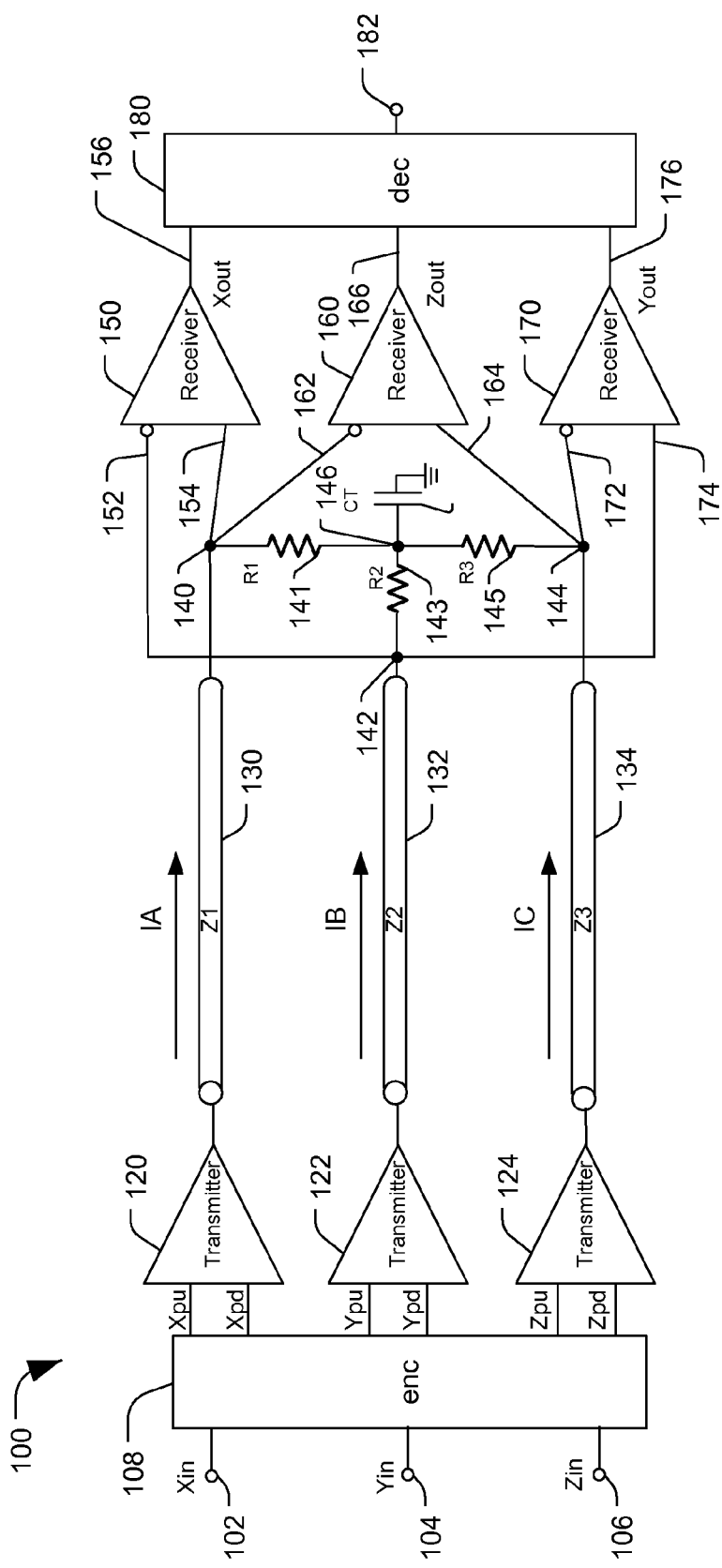
FIG. 1 is a diagram of a particular illustrative embodiment of a multiple transmitter system.

Referring to FIG. 1, a diagram of a particular illustrative embodiment of a multiple transmitter system is depicted and generally designated 100. A first representative input 102, a second representative input 104, and a third representative input 106 are provided to a data encoder 108. The data encoder 108 is coupled to a first transmitter 120, a second transmitter 122, and a third transmitter 124. The first transmitter 120 is coupled to a first transmission line 130. The second transmitter 122 is coupled to a second transmission line 132. The third transmitter 124 is coupled to a third transmission line 134. The transmission lines 130, 132, and 134 may include flex cable, a twisted trio, other types of conductive line or wire, or any combination thereof. For example, at least two of the transmission lines 130, 132, and 134 may include a twisted pair or a coaxial cable. The transmission lines 130, 132, and 134 have a common-mode Y-termination, with each of the transmission lines 130, 132, 134 coupled to a respective node 140, 142, and 144, that is coupled to a fourth node 146 via resistors 141, 143, and 145, respectively. The fourth node 146 is capacitively coupled to ground via a capacitor 148.

The first node 140 is coupled to an input 154 of a first receiver 150 and to an inverting input 162 of a second receiver 160. The second node 142 is coupled to an inverting input 152 of the first receiver 150 and to an input 174 of a third receiver 170. The third node 144 is coupled to an input 164 of the second receiver 160 and to an inverting input 172 of the third receiver 170. Each of the receivers 150, 160, and 170 provides an output 156, 166, and 176, respectively, to a decoder 180. The decoder 180 has a representative output 182.

Each transmitter 120, 122, 124 is a tri-state device that is responsive to control signals from the data encoder 108. In a particular embodiment, each transmitter 120, 122, and 124 operates in a first signaling state, a second signaling state, or an inactive state. Data received at the data encoder 108 may be represented by specific combinations of transmitter states that are detectable via voltage levels at the nodes 140, 142, and 144, which are coupled to inputs to the receivers 150, 160, and 170. In a particular embodiment, the system 100 is configured for reduced power signaling, where at most two of the three transmitters 120, 122, 124 are conductive and at least one of the three transmitters 120, 122, 124 is not conductive for each data symbol transmitted via the transmission lines 130, 132, and 134.

Figure 5:
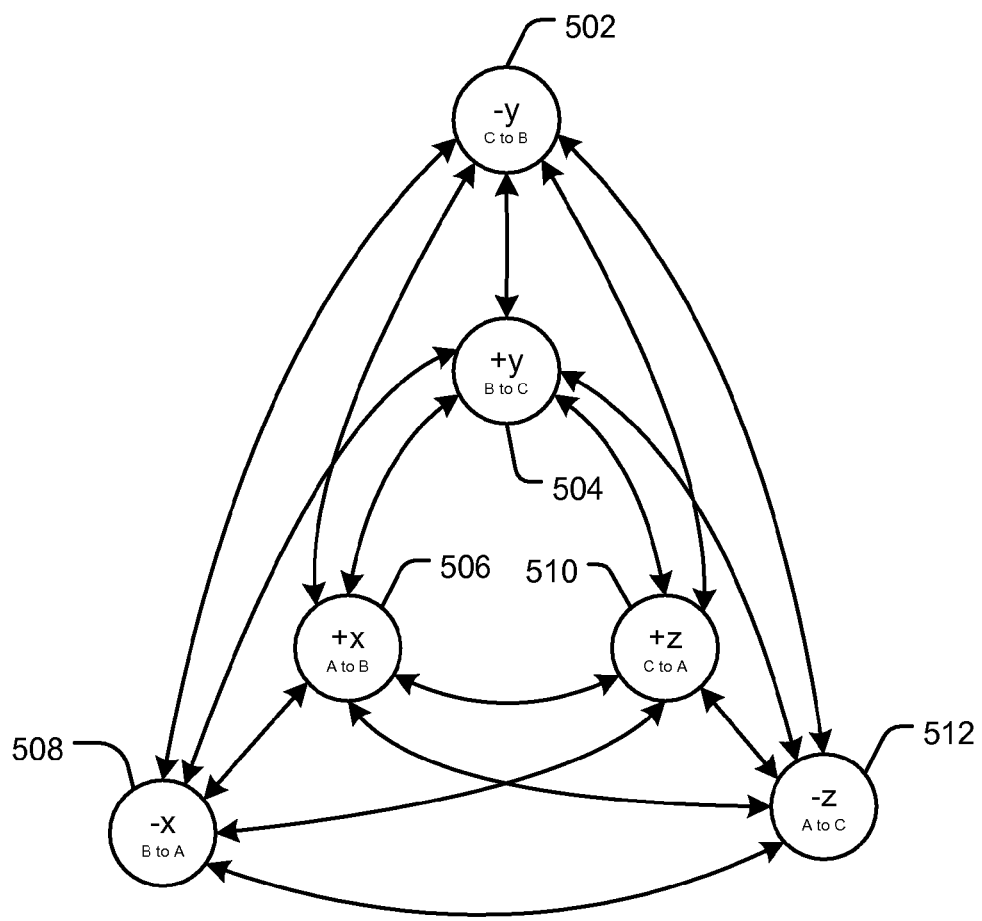
FIG. 5 is a general diagram of a particular illustrative embodiment of operating states of a multiple transmitter system.

During operation, in a particular embodiment, data received via the inputs 102-106 is transmitted as symbols corresponding to operating states of the three transmitters 120, 122, and 124. Each symbol can correspond to an operating state with one of the transmitters 120, 122, or 124 sourcing current, another of the transmitters 120, 122, or 124 sinking current, and the remaining transmitter 120, 122, or 124 in a high impedance state to restrict current flow through the corresponding transmission line 130, 132, or 134. Alternatively, each symbol can be represented as a transition between such operating states. Six such operating states or transitions exist. As a result, the system 100 can transmit approximately 2.5 bits of data per symbol, or approximately 0.83 bits per line. FIG. 5 depicts an illustrative example of operating states and transitions.

In a particular embodiment, the currents IA, IB, and IC through the transmission lines 130, 132, and 134, respectively, are each approximately equal to a value i, −i, or 0. For example, where the impedances Z1, Z2, Z3 of the transmission lines 130, 132, 134 and also R1, R2, R3 are approximately equal to a value Z0, a voltage at each node 140, 142, 144 is predictable for each symbol, and the receivers 150, 160, 170 may be configured to be responsive to the resulting input values without requiring a training period to determine reference values, such as may be required in certain multi-level signaling systems. Table 1 illustrates an example of operating values, where VAB is a voltage difference between node 140 and node 142, VBC is a voltage difference between node 142 and node 144, and VCA is a voltage difference between node 144 and node 140; X, Y, and Z correspond to receiver outputs 156, 166, and 176, respectively; and Name is a label to distinguish each of the six operating states.

TABLE 1

| IA | IB | IC | VAB | VBC | VCA | X | Y | Z | Name |
|---|---|---|---|---|---|---|---|---|---|
| −i | 0  | +i | −i * Z0      | −i * Z0      | +2 * i * Z0  | 0 | 0 | 1 | Z+ |
| 0  | +i | −i | −i * Z0      | +2 * i * Z0  | −i * Z0      | 0 | 1 | 0 | Y+ |
| −i | +i | 0  | −2 * i * Z0  | +i * Z0      | +i * Z0      | 0 | 1 | 1 | X− |
| +i | −i | 0  | +2 * i * Z0  | −i * Z0      | −i * Z0      | 1 | 0 | 0 | X+ |
| 0  | −i | +i | +i * Z0      | −2 * i * Z0  | +i * Z0      | 1 | 0 | 1 | Y− |
| +i | 0  | −i | +i * Z0      | +i * Z0      | −2 * i * Z0  | 1 | 1 | 0 | Z− |

The multiple transmitter system 100 offers advantages, such as straightforward data encoding and decoding that may be performed at the data encoder 108 and decoder 180 using lookup tables, hardware, processing algorithms, or any combination thereof. Data transmission may be performed over three lines at approximately 2.5 bits per symbol and 0.83 bits per line with power savings due to only two of the three transmitters being active at any given time. Further, common mode noise rejection is enhanced due to the common mode Y-termination of the transmission lines 130, 132, and 134, as compared to other configurations, such as a delta-termination configuration.

Although only three transmission lines are depicted, advantages of the system 100 may be obtained using four or more transmission lines and transmitters. For example, using four tri-state transmitters, each driving one of four transmission lines, twelve distinct states with two transmitters inactive per state, results in approximately 3.6 bits per symbol and 0.9 bits per line at the same power consumption for transmitting each symbol. Further, although only single-level signaling with matched resistances is described, the advantages of reduced power operation, enhanced common mode noise rejection, or both, may also be obtained with other resistances and signaling types. In addition, although three representative inputs 102-106 and one representative output 182 are depicted, any number of parallel input lines and output lines may be used, such as determined by design goals, cost of manufacture, other factors or criteria, or any combination thereof.

Figure 2:
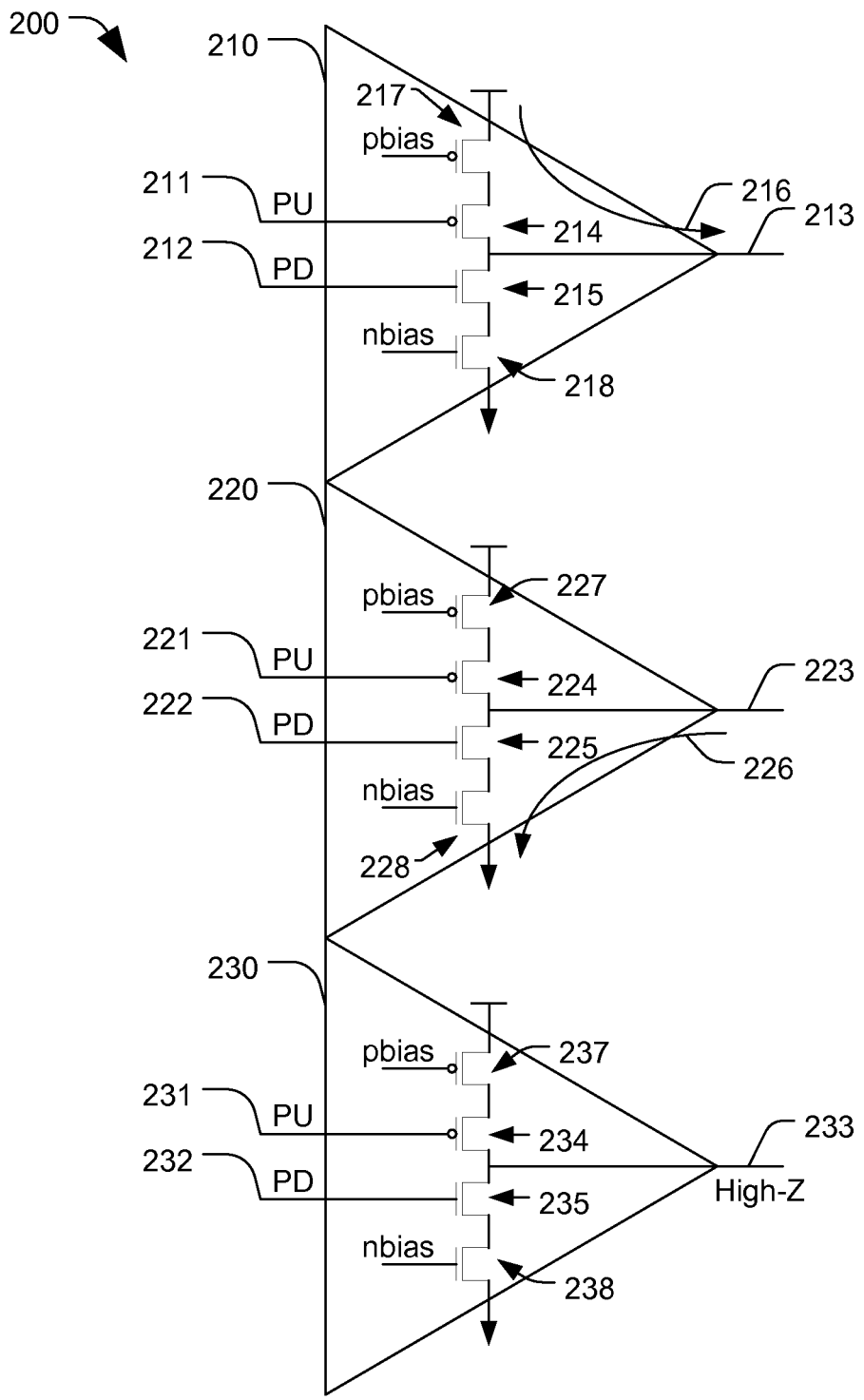
FIG. 2 is a diagram of another illustrative embodiment of a multiple transmitter system.

Referring to FIG. 2, a block diagram of another illustrative embodiment of a multiple transmitter system is depicted and generally designated 200. A first device 210 is coupled to receive a first input 211 and a second input 212 and to provide an output 213. A second device 220 is coupled to receive a first input 221 and a second input 222 and to provide an output 223. A third device 230 is coupled to receive a first input 231 and a second input 232 and to provide an output 233. In an illustrative embodiment, the devices 210, 220, and 230 may be the transmitters 120, 122, and 124 illustrated in FIG. 1.

The first input 211 of the first device 210 is coupled to a control terminal of a first switching element, such as a gate of a p-channel field effect transistor (p-channel FET) 214. The second input 212 of the first device 210 is coupled to a control terminal of a second switching element, such as a gate of an n-channel field effect transistor (n-channel FET) 215. The p-channel FET 214 and the n-channel FET 215 are coupled to the output 213. A first bias element, such as a first bias transistor 217, is coupled between a power supply and the p-channel FET 214. A second bias element, such as a second bias transistor 218, is coupled between the n-channel FET 215 and ground.

The first input 221 of the second device 220 is coupled to a control terminal of a first switching element, such as a gate of a p-channel FET 224. The second input 222 of the second device 220 is coupled to a control terminal of a second switching element, such as a gate of an n-channel FET 225. The p-channel FET 224 and the n-channel FET 225 are coupled to the output 223. A first bias element, such as a first bias transistor 227, is coupled between a power supply and the p-channel FET 224. A second bias element, such as a second bias transistor 228, is coupled between the n-channel FET 225 and ground.

The first input 231 of the third device 230 is coupled to a control terminal of a first switching element, such as a gate of a p-channel FET 234. The second input 232 of the third device 230 is coupled to a control terminal of a second switching element, such as a gate of an n-channel FET 235. The p-channel FET 234 and the n-channel FET 235 are coupled to the output 233. A first bias element, such as a first bias transistor 237, is coupled between a power supply and the p-channel FET 234. A second bias element, such as a second bias transistor 238, is coupled between the n-channel FET 235 and ground.

During operation, at least one of the devices 210, 220, and 230 may source current, at least a second of the devices 210, 220, and 230 may sink current, and at least a third of the devices 210, 220, and 230 may be in a high-impedance (high-Z) state. As illustrated, when a "0" signal is provided to the inputs 211 and 212 of the first device 210, the p-channel FET 214 is on, the n-channel FET 215 is off, and the first device 210 sources current 216 at the output 213. When a "1" signal is provided to the inputs 221 and 222 of the second device 220, the p-channel FET 224 is off, the n-channel FET 225 is on, and the second device 220 sinks current 226 at the output 213. When a "1" signal is received at the first input 231 of the third transmitter 230 and a "0" signal is received at the second input 232 of the third transmitter 230, both the p-channel FET 234 and then-channel FET 235 are off, and the output 233 is at a high-impedance state.

In a particular embodiment, switching points between operational states of each of the devices 210, 220, and 230 may be adjusted via the bias elements 217-218, 227-228, and 237-238, respectively, by adjusting input control signals pbias and nbias. For example, the devices 210, 220, and 230 may be included in the receivers 150, 160, and 170 of FIG. 1 and configured to respond to input voltage levels indicated in Table 1 to provide corresponding outputs to the decoder 180 to indicate each particular operating state.

Figure 3:
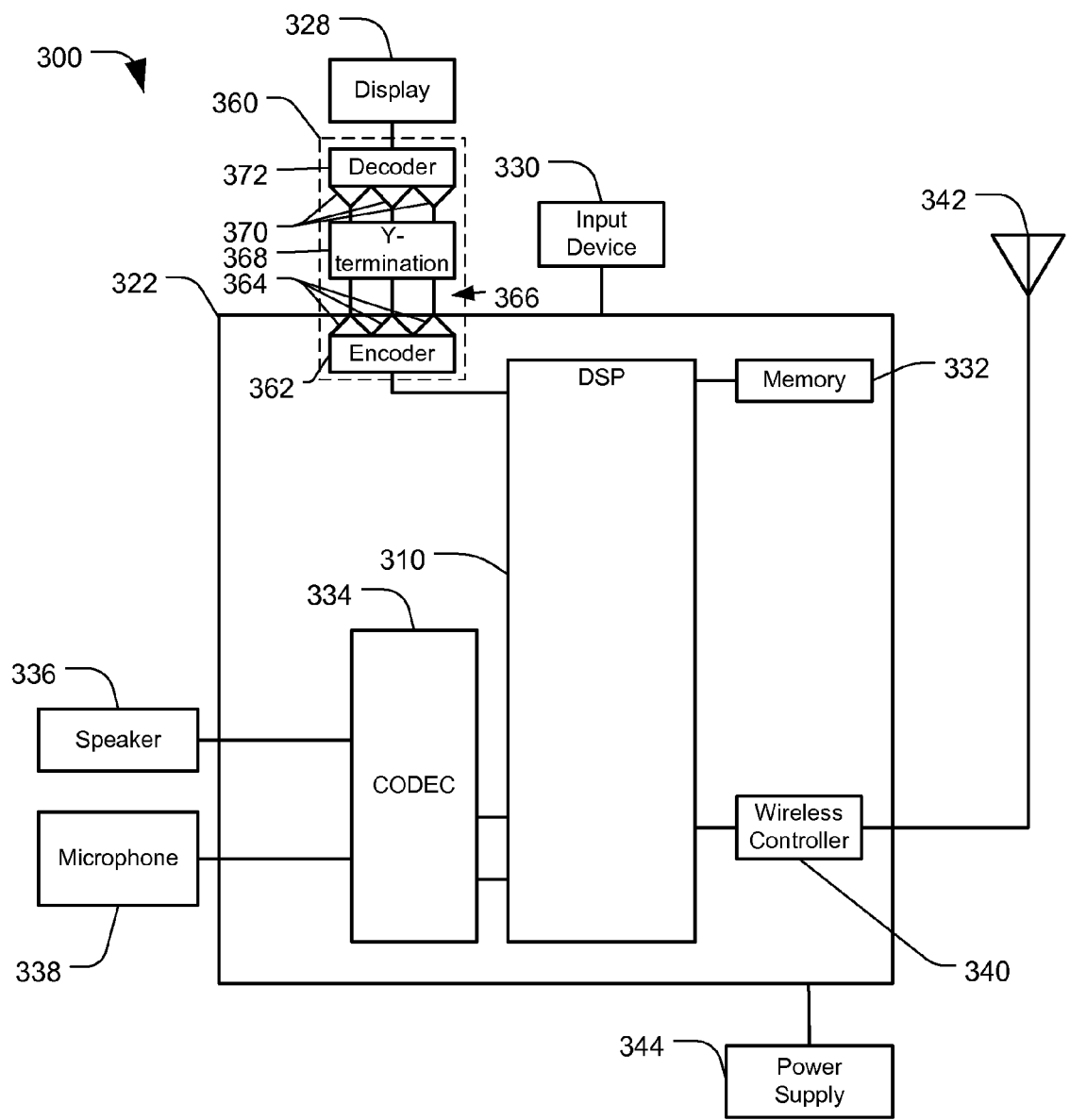
FIG. 3 is a block diagram of a particular illustrative embodiment of an electronic device including a multiple transmitter system.

Referring to FIG. 3, a block diagram of a particular illustrative embodiment of an electronic device including a multiple transmitter system is depicted and generally designated 300. The electronic device 300 includes a display 328 and a processing circuit 310, such as a digital signal processor (DSP). A serial interface 360 is coupled to the processing circuit 310 and to the display 328 and is adapted to provide multimedia data to the display 328. The serial interface 360 includes an encoder 362 coupled to the processing circuit 310. At least three receivers 370 are coupled to the encoder 362 and configured to receive a signal via at least three wires 366 from at least three transmitters 364. A decoder 372 is coupled to the receivers 370 and to the display 328. The at least three wires 366 have a Y-termination 368.

The serial interface 360 is configured so that during operation, at least two transmitters 364 are active and at least one transmitter 364 is inactive. In an illustrative embodiment, the serial interface 360 may include components of the systems illustrated in FIGS. 1 and 2.

FIG. 3 also shows a coder/decoder (CODEC) 334 can also be coupled to the processing circuit 310. A speaker 336 and a microphone 338 can be coupled to the CODEC 334.

FIG. 3 also indicates that a wireless controller 340 can be coupled to the processing circuit 310 and to a wireless antenna 342. In a particular embodiment, an input device 330 and a power supply 344 are coupled to the on-chip system 322. Moreover, in a particular embodiment, as illustrated in FIG. 3, the display 328, the input device 330, the speaker 336, the microphone 338, the wireless antenna 342, and the power supply 344 are external to the on-chip system 322. However, each can be coupled to a component of the on-chip system 322, such as an interface or a controller. For example, the input device 330 may also be coupled to the processing circuit 310 via a serial interface such as the serial interface 360, shown as coupled to the display 328.

Figure 4:
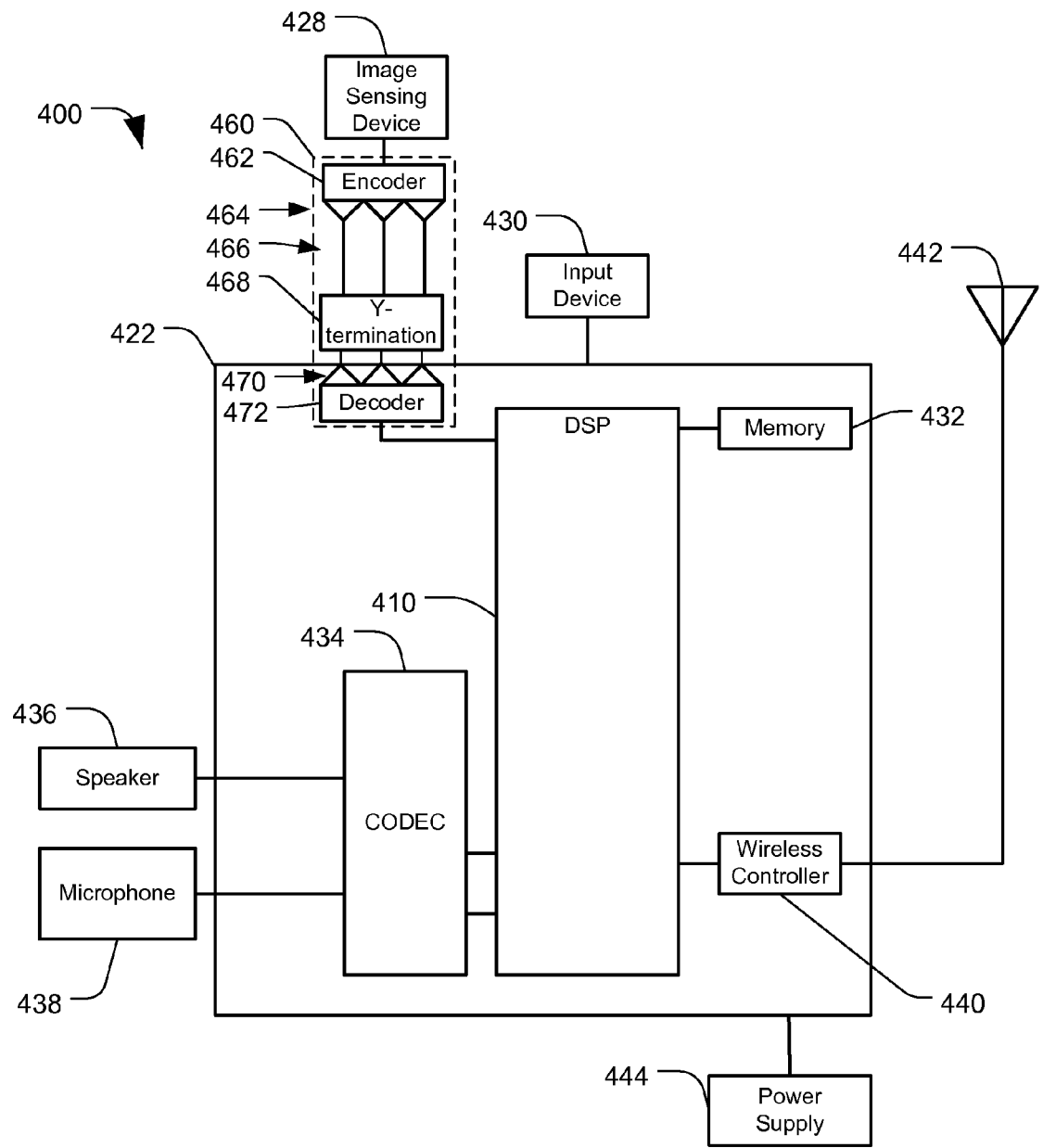
FIG. 4 is a block diagram of another illustrative embodiment of an electronic device including a multiple transmitter system.

Referring to FIG. 4, a block diagram of another illustrative embodiment of an electronic device including a multiple transmitter system is depicted and generally designated 400. The electronic device 400 includes an image sensing device 428 and a data processing circuit 410, such as a digital signal processor (DSP). A serial interface 460 is coupled to the processing circuit 410 and to the image sensing device 428. The serial interface 460 includes an encoder 462 coupled to the image sensing device 428 and to at least three transmitters 464. The transmitters 464 are coupled to receivers 470 via multiple lines 466. The receivers 470 are coupled to a decoder 472 that is coupled to the data processing circuit 410. During operation, at least two transmitters 464 are active and at least one of the transmitters 464 is inactive.

The serial interface 460 may be configured to transmit video data between the image sensing device 428 and the data processing circuit 410. In a particular embodiment, the image sensing device 428 is remote from the data processing circuit 410. For example, the image sensing device 428 may include a digital video camera and the serial interface 460 may transmit data captured at the digital video camera to the data processing circuit 410 for storage at a memory 432.

In a particular embodiment, the device 400 further includes a CODEC 434 and a wireless controller 440, each coupled to the data processing circuit 410 and packaged with the data processing circuit 410 in a system 422 having as a system on chip (SOC) or system in package (SiP) configuration. One or more speakers 436 or microphones 438 may be external to the system 422 and coupled to the CODEC 434. An antenna 442 may also be external to the system 422 and coupled to the wireless controller 440. In addition, an input device 430 and a power supply 444 may be coupled to one or more components of the system 422. In a particular embodiment, a serial interface using multiple transmitters, such as the serial interface 460, may be coupled to one or more other components of the device 400, such as to the input device 430.

Referring to FIG. 5, a general diagram of a particular illustrative embodiment of operating states of a multiple transmitter system is depicted and generally designated 500. A first state 502, a second state 504, a third state 506, a fourth state 508, a fifth state 510, and a sixth state 512 may each represent an operating state of a multiple transmitter system. Arrows indicate allowable transitions between operating states. In a particular embodiment, the operating states 502-512 may be states of the multiple transmitter systems illustrated in FIGS. 1-2, the serial interfaces 360 or 460 illustrated in FIGS. 3-4, or any combination thereof, having one transmitter sourcing current, one transmitter sinking current, and one transmitter in a high impedance (high-Z) state. In an illustrative embodiment, the operating states 502-512 correspond to operating states indicated in Table 1.

Each state 502-512 indicates a direction of current flow along three transmission lines labeled A, B, and C. In an illustrative embodiment, the transmission lines A, B, and C correspond to the transmission lines 130, 132, and 134 of FIG. 1. The first state 502 represents an operating state that includes a current flow from the transmission line C to the transmission line B, but not in the transmission line A. The second state 504 represents an operating state that includes current flow from the transmission line B to the transmission line C, but not the transmission line A. The third state 506 represents an operating state that includes a current flow from the transmission line A to the transmission line B, but not the transmission line C. The fourth state 508 represents an operating state that includes a current flow from the transmission line B to the transmission line A, but not the transmission line C. The fifth state 510 represents an operating state that includes a current flow from the transmission line C to the transmission line A, but not the transmission line B. The sixth state 512 represents an operating state that includes a current flow from the transmission line A to the transmission line C, but not the transmission line B.

As illustrated, a transition can occur from any state 502-512 to any other state 502-512, but self-transition cannot occur. For example, a system in the first state 502 during a first clock period cannot remain in the first state 502 during a next clock period. By forcing a transition between states each clock cycle, a clock signal is embedded in the transmitted data. The clock signal may be embedded by a transmitter that prohibits self-transition and that encodes each state to be different from a previous state and from a next state, i.e., a unique state per symbol period. The clock symbol may be recovered by a receiver, such as by using an edge detector and exclusive—or (XOR) logic. Because five transitions are available from each state, approximately 2.3 data bits, in addition to the clock signal, can be represented by each transition. In an alternative embodiment that allows self-transition but does not embed a clock signal, six transitions are available from each state and therefore approximately 2.5 data bits can be represented in each transition.

Figure 6:
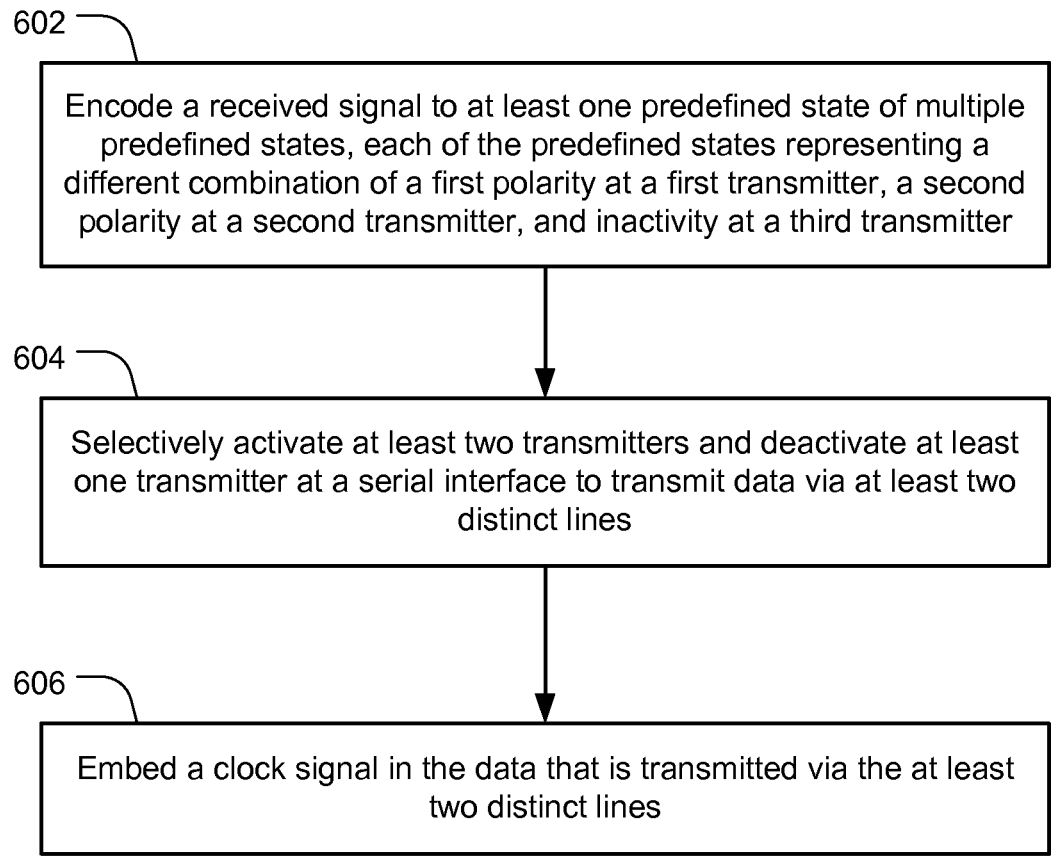
FIG. 6 is a flow diagram of a particular illustrative embodiment of a method of operating multiple transmitters.

Referring to FIG. 6, a flow diagram of a particular illustrative embodiment of a method of operating a multiple transmitter system is depicted. At 602, in a particular embodiment, a received signal is encoded to at least one predefined state of multiple predefined states. Each of the predefined states represents a different combination of a first polarity at a first transmitter, a second polarity at a second transmitter, and inactivity at a third transmitter. In an illustrative embodiment, the predefined states include the operating states illustrated in FIG. 5. The first polarity and the second polarity may indicate directions of current flow at the respective transmitters. For example, the first polarity at the first transmitter may indicate the first transmitter is sourcing current, while the second polarity at the second transmitter may indicate that the second transmitter is sinking current.

Continuing to 604, at least two transmitters are selectively activated and at least one transmitter is deactivated at a serial interface to transmit data via at least two distinct lines. Proceeding to 606, in a particular embodiment, a clock signal is embedded in the data that is transmitted via the at least two distinct lines.

In a particular embodiment, the multiple predefined states include a first state having the first polarity at the first transmitter, the second polarity at the second transmitter, and inactivity at the third transmitter; a second state having the second polarity at the first transmitter, the first polarity at the second transmitter, and inactivity at the third transmitter; a third state having inactivity at the first transmitter, the first polarity at the second transmitter, and the second polarity at the third transmitter; a fourth state having inactivity at the first transmitter, the second polarity at the second transmitter, and the first polarity at the third transmitter; a fifth state having the first polarity at the first transmitter, inactivity at the second transmitter, and the second polarity at the third transmitter; and a sixth state having the second polarity at the first transmitter, inactivity at the second transmitter, and the first polarity at the third transmitter. As an illustrative, non-limiting example, the first polarity, the second polarity, and the inactivity may be associated with states of a three-state transmitter, such as may be performed by the devices 210, 220, and 230 illustrated in FIG. 2. In another embodiment, the multiple predefined states may also include one or more states having the first polarity or the second polarity at a fourth transmitter, or where the fourth transmitter is inactive, or any combination thereof.

Figure 7:
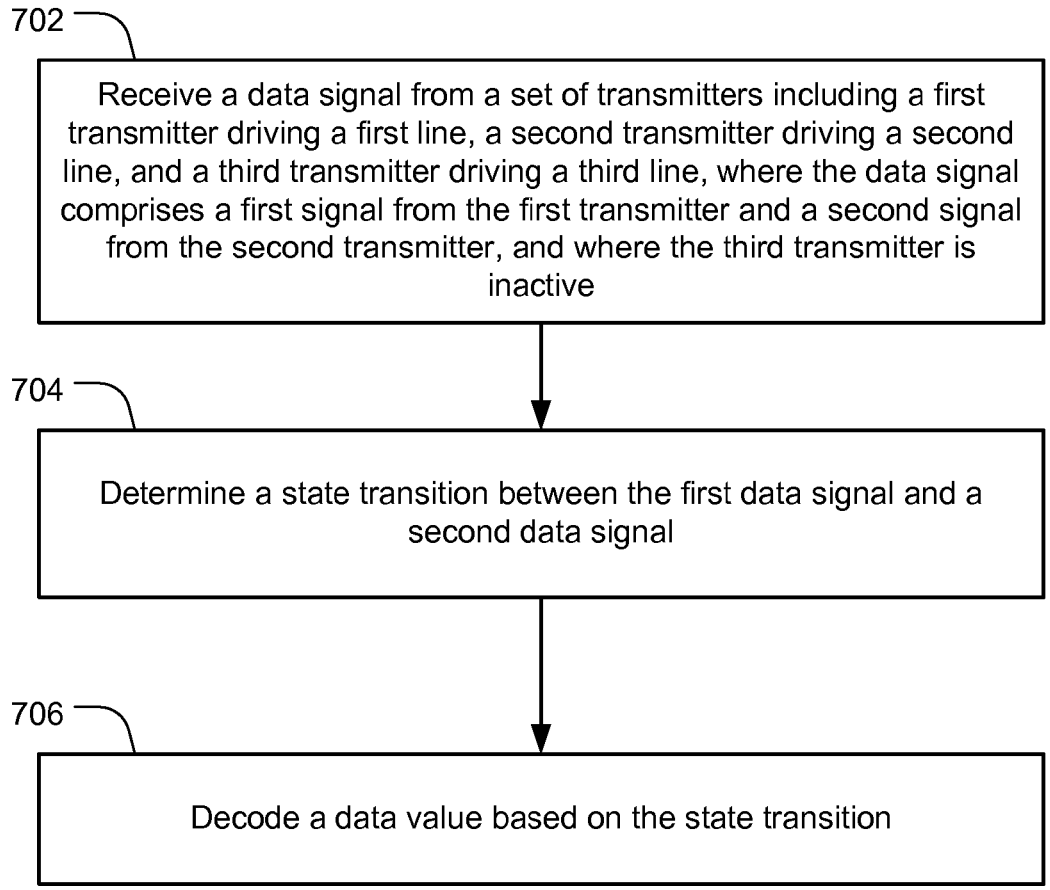
FIG. 7 is a flow diagram of a particular illustrative embodiment of a method of receiving data signals from multiple transmitters.

Referring to FIG. 7, a flow diagram of a particular illustrative embodiment of a method of receiving data signals from multiple transmitters is depicted. At 702, a first data signal is received from a multi-transmitter system. The received data signal comprises a first signal from a first transmitter and a second signal from a second transmitter, where a third transmitter is inactive. As an illustrative, non-limiting example, the first signal may include a current having a first polarity and the second signal may include a current having a second polarity.

Advancing to 704, in a particular embodiment, a state transition between the first data signal and a second data signal is determined. Continuing to 706, in a particular embodiment, a data value is decoded based on the state transition. In an illustrative embodiment, the state transition is determined by a decoder, such as the decoder 180 illustrated in FIG. 1. The decoder may decode a data value using a lookup table and may output multiple data bits represented by the state transition. In a particular embodiment, the first data signal and the second data signal are received and decoded at a receiver portion of a serialize/deserialize unit.

In connection with systems and methods described, a system may include means for serial transmission that includes at least three receivers configured to receive a signal via at least three wires from at least three transmitters, where at least two transmitters are active and at least one transmitter is inactive. For example, the means for serial transmission may include the serial interface 360 coupled to the processing circuit 310 and to the display 328 illustrated in FIG. 3. As another example, the means for serial transmission may include part or all of the system 100 illustrated in FIG. 1, the system 200 illustrated in FIG. 2, or any combination thereof. As yet another example, the means for serial transmission may include the serial interface 460 illustrated in FIG. 4. The means for serial transmission may include operating states and transitions between operating states as illustrated in FIG. 5, or may perform the method illustrated in FIG. 6 or FIG. 7, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A system comprising,
a first transmitter coupled to a first transmission line;
a second transmitter coupled to a second transmission line; and
a third transmitter coupled to a third transmission line,
wherein two of the three transmitters are conductive and wherein at least one of the three transmitters is not conductive; and
wherein signaling states of the system are based on polarity of currents flowing through the transmitters, and wherein a clock is embedded by forcing a transition between the signaling states on each cycle of the clock and prohibiting a self-transition between the signaling states.

2. The system of claim 1, wherein each transmitter is a tri-state device.

3. The system of claim 1, wherein a data encoder is coupled to each transmitter.

4. The system of claim 1, wherein the transmission lines have a Y-termination.

5. The system of claim 1, wherein the transmission lines have a common-mode termination.

6. The system of claim 1, wherein the transmission lines comprise flex cable.

7. The system of claim 1, wherein at least two of the transmission lines include a twisted pair.

8. The system of claim 1, wherein the transmission lines comprise a twisted trio.

9. An electronic device comprising:
a display;
a processing circuit; and
means for serial transmission coupled to the processing circuit and to the display, wherein the means for serial transmission includes at least three receivers configured to receive a signal via at least three wires from at least three transmitters, wherein at least two of the transmitters are active and at least one transmitter is inactive; and
wherein signaling states of the means for serial transmission are based on polarity of currents flowing through the means for serial transmission, and wherein a clock is embedded by forcing a transition between the signaling states on each cycle of the clock and prohibiting a self-transition between the signaling states.

10. The electronic device of claim 9, wherein the at least three wires have a Y-termination.

11. The electronic device of claim 9, wherein the means for serial transmission includes a serial interface adapted to provide multimedia data to the display.

12. The electronic device of claim 9, further comprising:
a microphone;
a speaker;
a wireless transceiver coupled to the processing circuit; and
an antenna coupled to the wireless transceiver.

13. An electronic device comprising:
an image sensing device;
a data processing circuit; and
a serial interface coupled to the data processing circuit and to the image sensing device, wherein the serial interface includes at least two active transmitters and at least one inactive transmitter; and
wherein signaling states of the serial interface are based on polarity of currents flowing through the transmitters, and wherein a clock is embedded by forcing a transition between the signaling states on each cycle of the clock and prohibiting a self-transition between the signaling states.

14. The electronic device of claim 13, wherein the image sensing device is remote from the data processing circuit.

15. The electronic device of claim 13, wherein the serial interface includes a coaxial cable coupled to at least two of the transmitters.

16. The electronic device of claim 13, wherein the serial interface is configured to transmit video data between the image sensing device and the data processing circuit.

17. A method, comprising:
selectively activating at least two transmitters and deactivating at least one transmitter at a serial interface to transmit data via at least two distinct lines; and
encoding a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock, wherein the multiple predefined states include:
a first state having the first polarity at the first transmitter, the second polarity at the second transmitter, and inactivity at the third transmitter;
a second state having the second polarity at the first transmitter, the first polarity at the second transmitter, and inactivity at the third transmitter;
a third state having inactivity at the first transmitter, the first polarity at the second transmitter, and the second polarity at the third transmitter;
a fourth state having inactivity at the first transmitter, the second polarity at the second transmitter, and the first polarity at the third transmitter;
a fifth state having the first polarity at the first transmitter, inactivity at the second transmitter, and the second polarity at the third transmitter; and
a sixth state having the second polarity at the first transmitter, inactivity at the second transmitter, and the first polarity at the third transmitter.

18. A method, comprising:
selectively activating at least two transmitters and deactivating at least one transmitter at a serial interface to transmit data via at least two distinct lines; and
encoding a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock, wherein the multiple predefined states further include a state where a fourth transmitter is inactive.

19. A method, comprising:
selectively activating at least two transmitters and deactivating at least one transmitter at a serial interface to transmit data via at least two distinct lines; and
encoding a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock and by prohibiting a self-transition state.

20. A method, comprising:
receiving a data signal from a set of transmitters including a first transmitter driving a first line, a second transmitter driving a second line, and a third transmitter driving a third line, wherein the data signal comprises a first signal from the first transmitter and a second signal from the second transmitter, and wherein the third transmitter is inactive,
wherein signaling states of the data signal are based on polarity of currents flowing through the transmitters, and wherein a clock is embedded in the data signal by forcing a transition between the signaling states on each cycle of the clock and prohibiting a self-transition between the signaling states.

21. The method of claim 20, wherein the first signal includes a current having a first polarity and wherein the second signal includes a current having a second polarity.

22. The method of claim 20, further comprising:
determining a state transition between the data signal and a second data signal; and
decoding a data value based on the state transition.

23. A device comprising:
a first transmitter for coupling to a first transmission line;
a second transmitter for coupling to a second transmission line;
a third transmitter for coupling to a third transmission line; and
an encoder device coupled to the first transmitter, the second transmitter, and the third transmitter, the encoder device adapted to
selectively activate at least two transmitters and deactivate at least one transmitter at a serial interface to transmit data via at least two distinct transmission lines; and
encode a received signal to at least one predefined state of multiple predefined states, each of the predefined states representing a different combination of a first polarity at the first transmitter, a second polarity at the second transmitter, and inactivity at the third transmitter and embedding a clock by forcing a transition between the predefined states, every cycle of the clock, wherein the multiple predefined states include:
a first state having the first polarity at the first transmitter, the second polarity at the second transmitter, and inactivity at the third transmitter;
a second state having the second polarity at the first transmitter, the first polarity at the second transmitter, and inactivity at the third transmitter;
a third state having inactivity at the first transmitter, the first polarity at the second transmitter, and the second polarity at the third transmitter;
a fourth state having inactivity at the first transmitter, the second polarity at the second transmitter, and the first polarity at the third transmitter;
a fifth state having the first polarity at the first transmitter, inactivity at the second transmitter, and the second polarity at the third transmitter; and
a sixth state having the second polarity at the first transmitter, inactivity at the second transmitter, and the first polarity at the third transmitter.

24. A non-transitory machine-readable medium comprising instructions for an encoder, which when executed by at least one processor causes the at least one processor to:
selectively activate at least two transmitters and deactivate at least one transmitter at a serial interface to transmit data via at least two distinct lines; and
encode a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock, wherein the multiple predefined states include:
a first state having the first polarity at the first transmitter, the second polarity at the second transmitter, and inactivity at the third transmitter;
a second state having the second polarity at the first transmitter, the first polarity at the second transmitter, and inactivity at the third transmitter;
a third state having inactivity at the first transmitter, the first polarity at the second transmitter, and the second polarity at the third transmitter;
a fourth state having inactivity at the first transmitter, the second polarity at the second transmitter, and the first polarity at the third transmitter;
a fifth state having the first polarity at the first transmitter, inactivity at the second transmitter, and the second polarity at the third transmitter; and
a sixth state having the second polarity at the first transmitter, inactivity at the second transmitter, and the first polarity at the third transmitter.

25. A device comprising:
a first transmitter for coupling to a first transmission line;
a second transmitter for coupling to a second transmission line;
a third transmitter for coupling to a third transmission line;
a fourth transmitter for coupling to a fourth transmission line; and
an encoder device coupled to the first transmitter, the second transmitter, and the third transmitter, the encoder device adapted to
selectively activate at least two transmitters and deactivate at least one transmitter at a serial interface to transmit data via at least two distinct transmission lines; and
encode a received signal to at least one predefined state of multiple predefined states, each of the predefined states representing a different combination of a first polarity at the first transmitter, a second polarity at the second transmitter, and inactivity at the third transmitter and embedding a clock by forcing a transition between the predefined states, every cycle of the clock wherein the multiple predefined states further include a state where the fourth transmitter is inactive.

26. A non-transitory machine-readable medium comprising instructions for an encoder, which when executed by at least one processor causes the at least one processor to:
selectively activate at least two transmitters and deactivate at least one transmitter at a serial interface to transmit data via at least two distinct lines; and encode a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock wherein the multiple predefined states further include a state where a fourth transmitter is inactive.

27. A device comprising:
a first transmitter for coupling to a first transmission line;
a second transmitter for coupling to a second transmission line;
a third transmitter for coupling to a third transmission line;
an encoder device coupled to the first transmitter, the second transmitter, and the third transmitter, the encoder device adapted to
   selectively activate at least two transmitters and deactivate at least one transmitter at a serial interface to transmit data via at least two distinct transmission lines; and
   encode a received signal to at least one predefined state of multiple predefined states, each of the predefined states representing a different combination of a first polarity at the first transmitter, a second polarity at the second transmitter, and inactivity at a third transmitter and embedding a clock by forcing a transition between the predefined states, every cycle of the clock and by prohibiting a self-transition state.

28. A non-transitory machine-readable medium comprising instructions for an encoder, which when executed by at least one processor causes the at least one processor to:
   selectively activate at least two transmitters and deactivate at least one transmitter at a serial interface to transmit data via at least two distinct lines; and
   encode a received signal to at least one predefined state of multiple predefined states, each of the predefined states representing a different combination of a first polarity at a first transmitter, a second polarity at a second transmitter, and inactivity at a third transmitter and embedding a clock by forcing a transition between the predefined states, every cycle of the clock and by prohibiting a self-transition state.

29. A device comprising:
a first receiver for coupling to a first transmitter driving a first line;
a second receiver for coupling to a second transmitter driving a second line;
a third receiver for coupling to a third transmitter driving a third line; and
a decoder device coupled to the first receiver, the second receiver, and the third receiver, the decoder device adapted to
   receive a data signal from the set of transmitters including the first transmitter, the second transmitter, and the third transmitter,
   wherein the data signal comprises a first signal from the first transmitter and a second signal from the second transmitter, and wherein the third transmitter is inactive,
   wherein signaling states of the data signal are based on polarity of currents flowing through the transmitters, and wherein a clock is embedded in the data signal by forcing a transition between the signaling states on each cycle of the clock and prohibiting a self-transition between the signaling states.

30. A non-transitory machine-readable medium comprising instructions for a decoder, which when executed by at least one processor causes the at least one processor to:
   receive a data signal from a set of transmitters including a first transmitter driving a first line, a second transmitter driving a second line, and a third transmitter driving a third line,
   wherein the data signal comprises a first signal from the first transmitter and a second signal from the second transmitter, and wherein the third transmitter is inactive,
   wherein signaling states of the data signal are based on polarity of currents flowing through the transmitters, and wherein a clock is embedded in the data signal by forcing a transition between the signaling states on each cycle of the clock and prohibiting a self-transition between the signaling states.

* * * * *